US012595925B2

(12) United States Patent
Fujita

(10) Patent No.: US 12,595,925 B2
(45) Date of Patent: Apr. 7, 2026

(54) AIR CONDITIONING SYSTEM

(71) Applicant: DAIKIN INDUSTRIES, LTD., Osaka (JP)

(72) Inventor: Naotoshi Fujita, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 901 days.

(21) Appl. No.: 17/554,527

(22) Filed: Dec. 17, 2021

(65) Prior Publication Data

US 2022/0107109 A1    Apr. 7, 2022

Related U.S. Application Data

(63) Continuation of application No. PCT/JP2020/023347, filed on Jun. 15, 2020.

(30) Foreign Application Priority Data

Jun. 21, 2019    (JP) ................................. 2019-115276

(51) Int. Cl.
*F24F 11/46* (2018.01)
*F24F 11/00* (2018.01)
(Continued)

(52) U.S. Cl.
CPC .............. *F24F 11/46* (2018.01); *F24F 11/74* (2018.01); *G05B 19/042* (2013.01);
(Continued)

(58) Field of Classification Search
None
See application file for complete search history.

(56) References Cited

U.S. PATENT DOCUMENTS

2015/0253024 A1* 9/2015 Murakami ............... F24F 11/46
165/251
2015/0316276 A1* 11/2015 Matsugi ............... F24F 11/0001
62/160
(Continued)

FOREIGN PATENT DOCUMENTS

EP       2 902 720 A1    8/2015
JP       5-18582 A       1/1993
(Continued)

OTHER PUBLICATIONS

Machine Translation of WO-2006054586-A1 (Year: 2006).*
(Continued)

*Primary Examiner* — Kamini S Shah
*Assistant Examiner* — Istiaque Ahmed
(74) *Attorney, Agent, or Firm* — Birch, Stewart, Kolasch & Birch, LLP

(57) ABSTRACT

An air-conditioning system includes an outside air processing device, an air-conditioning device, and a control unit. The outside air processing device adjusts the temperature of outside air taken thereinto, and supplies the outside air to a plurality of indoor spaces. The air-conditioning device includes a plurality of indoor units at least one of which is installed in each of a plurality of target spaces that are some or all of the indoor spaces. The air-conditioning device adjusts the temperatures of air in the target spaces. The control unit adjusts the flow rate of air blown into each target space by the outside air processing device in accordance with an operating state of the at least one of the indoor units to reduce power consumption of the air-conditioning system.

11 Claims, 3 Drawing Sheets

(51) Int. Cl.

| | |
|---|---|
| *F24F 11/74* | (2018.01) |
| *F24F 110/10* | (2018.01) |
| *F24F 110/12* | (2018.01) |
| *G05B 19/042* | (2006.01) |

(52) U.S. Cl.

CPC ... *F24F 2011/0002* (2013.01); *F24F 2110/10* (2018.01); *F24F 2110/12* (2018.01); *G05B 2219/2614* (2013.01)

(56) References Cited

U.S. PATENT DOCUMENTS

| | | | | |
|---|---|---|---|---|
| 2016/0146480 | A1 | 5/2016 | Ito et al. | |
| 2020/0080742 | A1* | 3/2020 | Okamoto | ............... G05B 17/02 |
| 2021/0025617 | A1* | 1/2021 | Hamada | .................. F24F 11/77 |
| 2021/0404695 | A1* | 12/2021 | Saito | ........................ F24F 11/46 |

FOREIGN PATENT DOCUMENTS

| | | | | |
|---|---|---|---|---|
| JP | 2010-266199 | A | 11/2010 | |
| JP | 2012-63117 | A | 3/2012 | |
| JP | 2018-173264 | A | 11/2018 | |
| WO | WO-2006054586 | A1 * | 5/2006 | .............. F24F 11/46 |

OTHER PUBLICATIONS

Extended European Search Report for corresponding European Application No. 20826160.2, dated Jul. 6, 2022.

International Search Report (PCT/ISA/210) issued in PCT/JP2020/023347, dated Sep. 1, 2020.

English translation of the International Preliminary Report on Patentability and Written Opinion of the International Searching Authority for International Application No. PCT/JP2020/023347, dated Dec. 30, 2021.

\* cited by examiner

AIR CONDITIONING SYSTEM

CROSS REFERENCE TO RELATED APPLICATIONS

This application is a Continuation of PCT International Application No. PCT/JP2020/023347, filed on Jun. 15, 2020, which claims priority under 35 U.S.C. 119(a) to Patent Application No. 2019-115276, filed in Japan on Jun. 21, 2019, all of which are hereby expressly incorporated by reference into the present application.

TECHNICAL FIELD

The present disclosure relates to an air-conditioning system.

BACKGROUND ART

Techniques which are applied to an air-conditioning system configured to condition air in a target space and which have been known in the art include a technique in which the flow rate of conditioned air blown out of a plurality of blower units into the target space is adjusted for each of the blower units (see, for example, Patent Document 1).

CITATION LIST

Patent Document

Patent Document 1: Japanese Unexamined Patent Publication No. H05-18582

SUMMARY

A first aspect of the present disclosure is directed to an air-conditioning system (100) including: an outside air processing device (10) configured to adjust a temperature of outside air taken into the outside air processing device (10) and to supply the outside air to a plurality of indoor spaces; and an air-conditioning device (20) including a plurality of indoor units (22) at least one of which is installed in each of a plurality of target spaces (SP1, SP2) that are some or all of the indoor spaces. The air-conditioning device (20) is configured to adjust temperatures of air in the target spaces (SP1, SP2). The air-conditioning system (100) further includes: a control unit (30) configured to adjust a flow rate of air blown into each target space (SP1, SP2) by the outside air processing device (10) in accordance with an operating state of the at least one of the indoor units (22) to reduce power consumption of the air-conditioning system (100).

BRIEF DESCRIPTION OF THE DRAWINGS

FIG. 3 relates to an air-conditioning system of another embodiment, and corresponds to FIG. 2.

DESCRIPTION OF EMBODIMENTS

First Embodiment

A first embodiment will be described below. An air-conditioning system (100) of this embodiment achieves air conditioning in an indoor space included in a structure, such as a house, a building, a factory, or a public facility.

Figure 1:
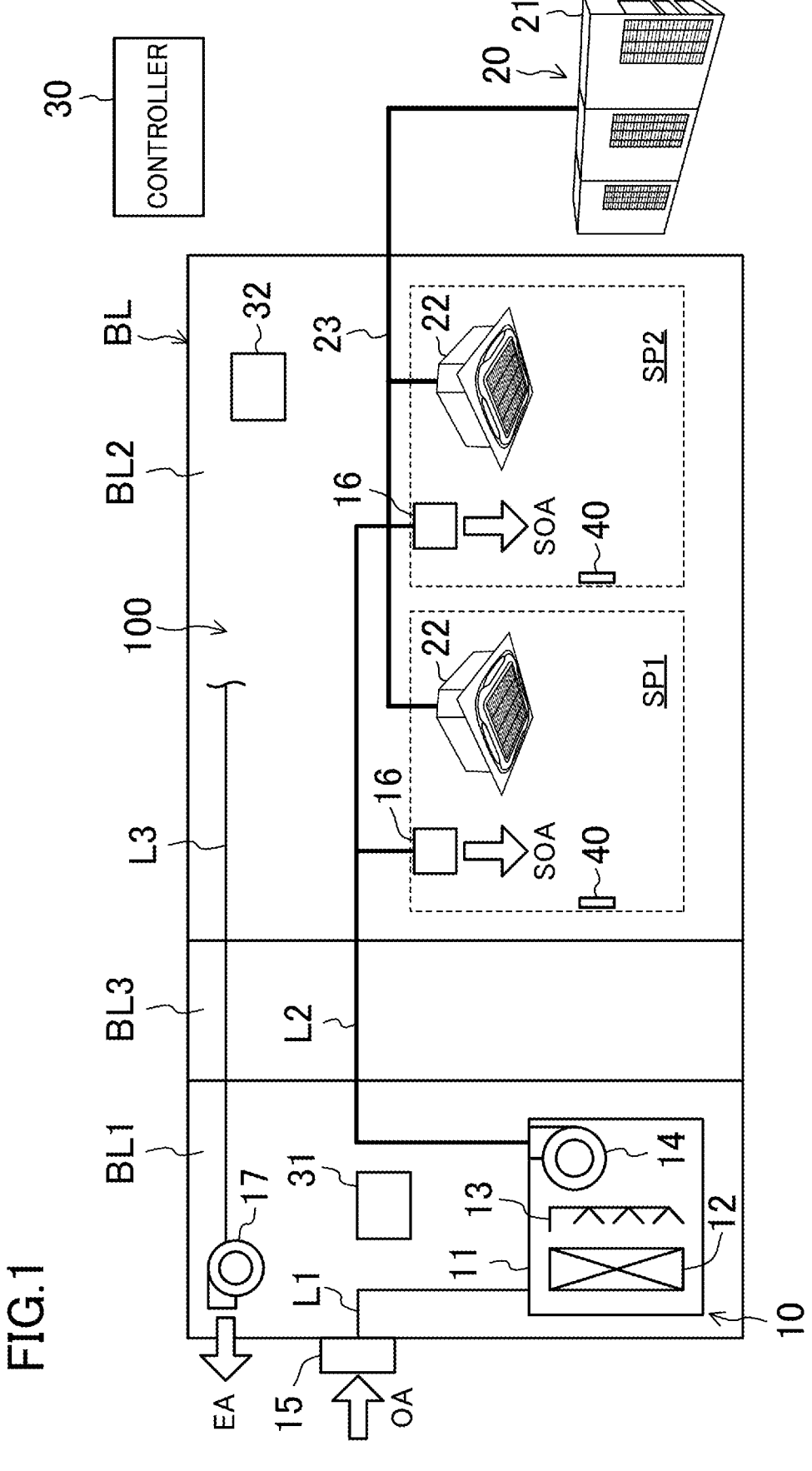
FIG. 1 illustrates an exemplary configuration of an air-conditioning system according to a first embodiment.

As illustrated in FIG. 1, the air-conditioning system (100) of this embodiment is used for a building (BL) including a plurality of (for example, two) indoor spaces (SP1, SP2). The indoor spaces (SP1, SP2) may be completely separated from each other by a wall or any other similar element, or may be simply separated from each other by a screen or any other similar element. The building (BL) includes a machine chamber (BL1) where an outside air processing device (10) described below is disposed, an exclusive section (BL2) including the indoor spaces (SP1, SP2), and a corridor (BL3) interposed between the machine chamber (BL1) and the exclusive section (BL2). In the building (BL) provided with the air-conditioning system (100) of this embodiment, all of the indoor spaces are target spaces (SP1, SP2) each provided with indoor units (22) of an air-conditioning device (20) described below.

The air-conditioning system (100) includes the outside air processing device (10), the air-conditioning device (20), and a controller (30). The outside air processing device (10) adjusts the temperature and humidity of outside air (OA) taken thereinto, and then supplies the adjusted air to the target spaces (SP1. SP2). The outside air (OA) is air outside the target spaces (SP1, SP2) (in this embodiment, air outside the building (BL)). The air-conditioning device (20) adjusts the temperatures of air (inside air) in the target spaces (SP1, SP2). The controller (30) constitutes a control unit.

In the air-conditioning system (100), the operating states of the outside air processing device (10) and the air-conditioning device (20) are changed by entering commands as appropriate into remote controls (40) installed in the respective target spaces (SP1, SP2). The controller (30) controls the operating states of the outside air processing device (10) and the air-conditioning device (20) in accordance with the commands entered into the remote controls (40) (commands related to start/stop, the type of operation, a set temperature, a set airflow rate, and other elements) and the temperatures, humidities, and other parameters of the outside air (OA) and the inside air.

Configuration of Outside Air Processing Device

The outside air processing device (10) includes, as main components, an air handling unit (11) and a chiller unit (not shown) serving as a heat source unit. The air handling unit (11) may be a water-operated air handling unit or a refrigerant-operated air handling unit (a direct expansion air handling unit).

The outside air processing device (10) in operation takes outside air (OA) from an intake port (15) formed in an outer wall of the building (BL) through an intake duct (L1) into the air handling unit (11). The outside air processing device (10) cools or heats, or dehumidifies or humidifies, the taken outside air (OA), and supplies the resultant air as supply air (SOA) through an air supply duct (L2) and air supply ports (16) to the target spaces (SP1, SP2).

The outside air processing device (10) uses an exhaust fan (17) to release exhaust air (EA) from exhaust ports (not shown) of the target spaces (SP1, SP2) through an exhaust duct (L3) to the outside of the building (BL).

The air handling unit (11) includes, as main components, an outside air heat exchanger (12), a humidifier (13), and an air supply fan (14). The outside air heat exchanger (12) includes heat transfer tubes and heat transfer fins.

The outside air heat exchanger (12) exchanges heat between outside air (OA) passing through an area surrounding the heat transfer tubes and the heat transfer fins and a heating medium passing through the heat transfer tubes. The humidifier (13) humidifies the outside air (OA) that has passed through the outside air heat exchanger (12). The system and model of the humidifier (13) are not specifically limited. For example, a typical natural evaporation (vaporizing) humidifier may be used.

The air supply fan (14) is a blower used to take outside air (OA) into the air handling unit (11) and to send the taken air to the air supply duct (L2). The model of the air supply fan (14) is not specifically limited. For example, a sirocco fan may be used. The air supply fan (14) includes a fan motor, which is controlled by an inverter to adjust the rotational speed of the fan motor. As can be seen, the air supply fan (14) can change the airflow rate.

The air handling unit (11) includes various sensors, such as an outside-air temperature sensor and an outside-air humidity sensor that detect the temperature and humidity of outside air (OA) sucked into the air handling unit (11), and a supply-air temperature sensor that detects the temperature of supply air (SOA) to be sent to the air supply duct (L2) (the target spaces (SP1. SP2)).

Figure 2:
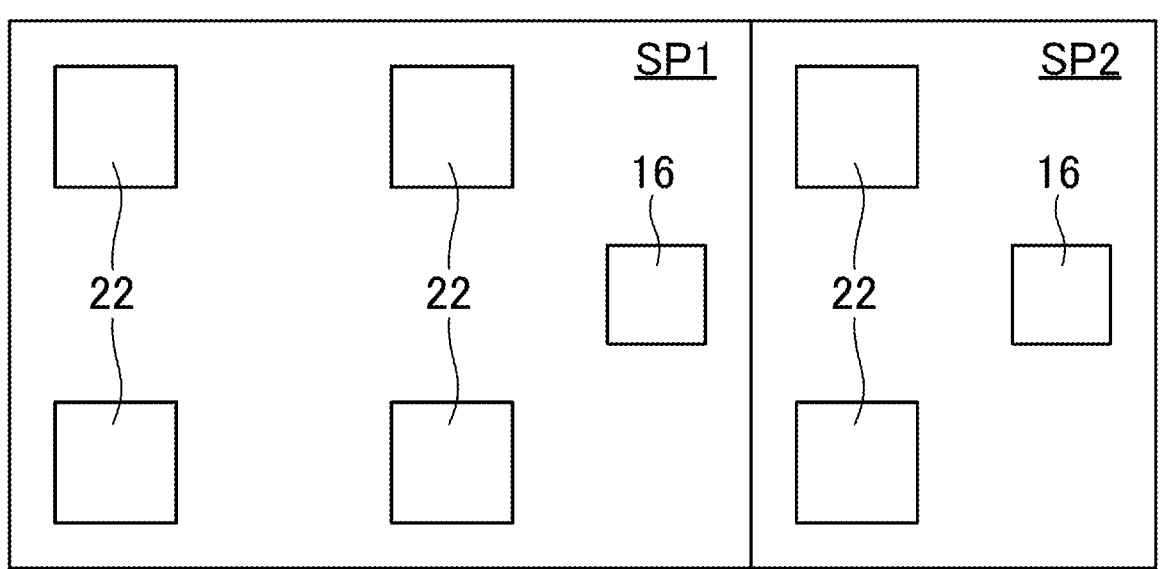
FIG. 2 is a plan view illustrating an exemplary arrangement of indoor units and an air supply port in each of target spaces.

The air supply duct (L2) is a member that forms a flow path for outside air (OA). The air supply duct (L2) has its one end connected to the air handling unit (11) so that the air supply fan (14) driven allows outside air (OA) to flow into the air supply duct (L2). The other end of the air supply duct (L2) branches into a plurality of branches, and communicates with the target spaces (SP1, SP2) at respective destinations of the branches. Specifically, the other end (respective destinations of the branches) of the air supply duct (L2) is connected to the air supply ports (16) formed in the ceilings of the target spaces (SP1, SP2). As illustrated in FIG. 2, each target space (SP1, SP2) has one of the air supply ports (16). Each air supply port (16) includes a damper (not shown) configured to adjust the airflow rate. The number of the air supply ports (16) provided for each targe space (SP1, SP2) may be any number that is greater than or equal to one.

The outside air processing device (10) has a control unit (31) for outside air controller. The control unit (31) for outside air controller controls operations of components included in the outside air processing device (10). The control unit (31) for outside air controller includes a central processing unit (CPU), a memory, and various electric components. The control unit (31) for outside air controller is connected to devices included in the outside air processing device (10) through wires. The control unit (31) for outside air controller is electrically connected to the controller (30) and the remote controls (40) through communication lines. In this embodiment, the control unit (31) for outside air controller is configured by electrically connecting a microcomputer and an associated electric component that are arranged in the air handling unit (11) or the chiller unit.

The control unit (31) for outside air controller sets a target value of the supply air temperature in accordance with the set temperature and other parameters, and adjusts operations of the components as appropriate based on the target value. The operating capacity (air conditioning capacity) of the outside air processing device (10) is changed as appropriate in this manner. The target value of the supply air temperature may be set by the controller (30).

Configuration of Air-Conditioning Device

The air-conditioning device (20) includes a refrigerant circuit (not shown). A refrigerant is circulated through the refrigerant circuit to perform a vapor compression refrigeration cycle, thereby achieving air conditioning, such as cooling, dehumidification, or heating of the target spaces (SP1, SP2). The air-conditioning device (20) has a plurality of operating modes, and operates in accordance with the operating modes. Specifically, the air-conditioning device (20) performs operations, such as a cooling operation for cooling, a heating operation for heating, and a defrosting operation for defrosting.

The air-conditioning device (20) includes, as main components, a single outdoor unit (21) serving as a heat source unit, and a plurality of (e.g., six) indoor units (22). The model of the air-conditioning device (20) is not specifically limited. For example, a variable refrigerant volume (VRV) air-conditioning device may be used.

In the air-conditioning device (20), the outdoor unit (21) and the indoor units (22) are connected together via a connection pipe (23) to form a refrigerant circuit. The refrigerant enclosed in the refrigerant circuit is not specifically limited. For example, a hydrofluorocarbon (HFC) refrigerant, such as a refrigerant R32 or R410A, may be used.

The outdoor unit (21) is disposed outside the target spaces (SP1, SP2) (in this embodiment, outside the building (BL)). The outdoor unit (21) includes, as main components, a compressor, a four-way switching valve, an outdoor heat exchanger, an outdoor expansion valve, and an outdoor fan.

The compressor compresses a low-pressure refrigerant in the refrigeration cycle to a high-pressure refrigerant. The four-way switching valve is a flow path switching means configured to change the flow direction of the refrigerant in the refrigerant circuit. The outdoor heat exchanger exchanges heat between an air flow passing therethrough (an outdoor air flow produced by the outdoor fan) and the refrigerant. The outdoor heat exchanger functions as an evaporator for the refrigerant in a normal cycle of operation (the heating operation), and as a condenser or a radiator for the refrigerant in a reverse cycle of operation (the cooling operation or the defrosting operation). The outdoor expansion valve is a valve that functions as a pressure reducer or a flow rate regulator for the refrigerant, such as an electric expansion valve capable of controlling its opening degree, and is disposed between the outdoor heat exchanger and a liquid-side connection pipe.

The outdoor fan produces an outdoor air flow. The outdoor air flow is a flow of outside air that flows into the outdoor unit (21), passes through the outdoor heat exchanger, and flows out of the outdoor unit (21). The outdoor air flow is a heating source of the refrigerant in the outdoor heat exchanger during the normal cycle of operation, and is a cooling source of the refrigerant in the outdoor heat exchanger during the reverse cycle of operation. The outdoor fan includes a fan motor, which is controlled by an inverter to adjust the rotational speed of the fan motor. As can be seen, the outdoor fan can change the airflow rate.

The outdoor unit (21) includes various sensors, such as a suction pressure sensor configured to detect the pressure of the refrigerant sucked into the compressor and a discharge pressure sensor configured to detect the pressure of the refrigerant discharged from the compressor.

The indoor units (22) are disposed in the corresponding target spaces (SP1, SP2). In this embodiment, the six indoor units (22) are connected in parallel to the single outdoor unit (21). As illustrated in FIG. 2, four of the indoor units (22) are provided for one of the target spaces (SP1), and two of the indoor units (22) are provided for the other target space (SP2). The number of the indoor units (22) provided for each targe space (SP1, SP2) may be any number that is greater than or equal to one. The model of each indoor unit (22) is not specifically limited. For example, the indoor unit (22) may be a ceiling-mounted indoor unit mounted on the ceiling of the associated target space (SP1, SP2). In this case, each indoor unit (22) is installed in the associated target space (SP1, SP2) such that its inlet and outlet are exposed from the ceiling.

Each indoor unit (22) includes, as main components, an indoor heat exchanger, an indoor expansion valve, and an indoor fan.

The indoor heat exchanger exchanges heat between an air flow passing therethrough (an indoor air flow produced by the indoor fan) and the refrigerant. The indoor heat exchanger functions as a condenser or a radiator for the refrigerant in the normal cycle operation, and as an evaporator for the refrigerant in the reverse cycle of operation. The indoor expansion valve is a valve that functions as a pressure reducer or a flow rate regulator for the refrigerant, such as an electric expansion valve capable of controlling its opening degree, and is disposed between the indoor heat exchanger and a liquid-side connection pipe.

The indoor fan produces an indoor air flow. The indoor air flow is a flow of inside air that flows into the indoor unit (22), passes through the indoor heat exchanger, and flows out of the indoor unit (22). The indoor air flow is a cooling source of the refrigerant in the indoor heat exchanger during the normal cycle of operation, and is a heating source of the refrigerant in the indoor heat exchanger during the reverse cycle of operation. The indoor fan includes a fan motor, which is controlled by an inverter to adjust the rotational speed of the fan motor. As can be seen, the indoor fan can change the airflow rate.

Each indoor unit (22) includes various sensors, such as an indoor temperature sensor, an indoor humidity sensor, and a carbon dioxide concentration sensor configured to detect the temperature, humidity, and carbon dioxide concentration, respectively, of an indoor air flow (inside air) sucked into the indoor unit (22), and a refrigerant temperature sensor configured to detect the temperature of the refrigerant in the indoor heat exchanger.

The air-conditioning device (20) has a control unit (32) for air conditioner. The control unit (32) for air conditioner controls operations of components included in the air-conditioning device (20). The control unit (32) for air conditioner includes a CPU, a memory, and various electric components. The control unit (32) for air conditioner is connected to devices included in the air-conditioning device (20) through wires. The control unit (32) for air conditioner is electrically connected to various sensors arranged in each indoor unit (22). The control unit (32) for air conditioner is communicably connected to the remote controls (40) installed in the respective target spaces (SP1, SP2). The control unit (32) for air conditioner is electrically connected to the controller (30) and the remote controls (40) through communication lines.

In this embodiment, the control unit (32) for air conditioner is configured by electrically connecting a microcomputer and an associated electric component that are arranged in the outdoor unit (21) and the indoor units (22). The control unit (32) for air conditioner sets a target value of the evaporation temperature in each indoor unit (22) in accordance with the set temperature, the indoor temperature, and other conditions, and adjusts the capacity of the compressor, the airflow rate of the outdoor fan, and other parameters as appropriate based on the target value. The operating capacity (air conditioning capacity) of the air-conditioning device

(20) is changed as appropriate in this manner. The target value of the evaporation temperature may be set by the controller (30).

Controller and Remote Control

The controller (30) is a functional unit that controls an operation of the air-conditioning system (100) as a whole. Specifically, the controller (30) includes a computer including a memory and a CPU. The computer executes a program to perform the functions of the air-conditioning system (100). The program is recorded in a computer-readable recording medium, such as a read only memory (ROM).

The controller (30) is electrically connected to the control unit (31) for outside air controller and the control unit (32) for air conditioner, and transmits and receives signals to and from these units. The controller (30) transmits a predetermined signal (e.g., a control signal for setting a target supply air temperature or a target evaporation temperature) to the control unit (31) for outside air controller and the control unit (32) for air conditioner, thereby making it possible to control operations of devices that constitute the outside air processing device (10) and the air-conditioning device (20). The controller (30) can acquire detection values of various sensors disposed in the outside air processing device (10) and the air-conditioning device (20), and information determining the operating states of the outside air processing device (10) and the air-conditioning device (20).

The remote controls (40) are input devices to which a user inputs various commands for changing the operating states (start/stop, the type of operation, the set temperature, the set humidity, the set airflow rate, and other parameters) of the outside air processing device (10) and the air-conditioning device (20) individually. Each of the remote controls (40) also functions as a display for displaying predetermined information (such as the operating states of the outside air processing device (10) and the air-conditioning device (20) and the temperatures and humidities of inside air and outside air).

Operation of Air-Conditioning System

How the air-conditioning system (100) operates will be described below. The air-conditioning system (100) of this embodiment can selectively execute a common cooling operation and a common heating operation. The controller (30) selects which of these operations should be executed. Note that operations that can be executed by the air-conditioning system (100) are not limited to the foregoing operations.

Common Cooling Operation

The common cooling operation is an operation in which the outside air processing device (10) and the air-conditioning device (20) execute a cooling operation. Specifically, in the common cooling operation, the outside air processing device (10) executes an outside air cooling operation (the cooling operation in which outside air (OA) having a temperature that is lower than the indoor temperature is used), and the air-conditioning device (20) executes a cooling operation. In the common cooling operation, the target spaces (SP1, SP2) may, but do not have to, be dehumidified.

Basic Operation

In the common cooling operation, the air supply fan (14) of the outside air processing device (10) is operated. This allows outside air (OA) to be taken through the intake port (15) into the air handling unit (11). The outside air (OA) taken into the air handling unit (11) is blown through the air supply ports (16) into the respective target spaces (SP1, SP2). The controller (30) adjusts the rotational speed of the air supply fan (14) to adjust the total airflow rate of the outside air processing device (10), and adjusts the opening degree of the damper for each air supply port (16) to adjust the flow rate of air blown into the associated target space (SP1, SP2).

In the common cooling operation, the air-conditioning device (20) performs a reverse cycle of operation. This allows inside air cooled by the indoor units (22) for each target space (SP1, SP2) to be blown into the target space (SP1, SP2). The controller (30) controls the devices that constitute the air-conditioning device (20) to bring the evaporation temperature in each indoor unit (22) closer to its target value (in other words, the required temperature of a heating medium in each indoor unit (22)).

Here, the load factor of each indoor unit (22) (specifically, the ratio of the load of each indoor unit (22) to the rated capacity of the indoor unit (22)) increases as the target value of the evaporation temperature decreases. The load factor of an operating one of the indoor units (22) is higher than that of a nonoperating one of the indoor units (22).

Adjustment of Flow Rates of Air Blown into Target Spaces

In the common cooling operation, the controller (30) adjusts the flow rates of air blown into the target spaces (SP1, SP2) by the outside air processing device (10) to reduce the power consumption of the air-conditioning system (100).

As a specific example, if the total airflow rate of the outside air processing device (10) is to be increased during the common cooling operation (in other words, if the rotational speed of the air supply fan (14) is to be increased), the controller (30) controls the increment of the flow rate of air blown into one of the target spaces (SP1, SP2) provided with the associated indoor units (22) in each of which the target value of the evaporation temperature is relatively low to be greater than or equal to the increment of the flow rate of air blown into the other target space (SP1, SP2) provided with the associated indoor units (22) in each of which the target value of the evaporation temperature is relatively high. In this case, the controller (30) may control the increment of the flow rate of air blown into the one of the target spaces (SP1, SP2) provided with the associated indoor units (22) in each of which the target value of the evaporation temperature is relatively low to be greater than the increment of the flow rate of air blown into the other target space (SP1, SP2) provided with the associated indoor units (22) in each of which the target value of the evaporation temperature is relatively high.

Suppose that, for example, in the common cooling operation, the target value of the evaporation temperature in each of the indoor units (22) for one of the target spaces (SP1) is lower than the target value of the evaporation temperature in each of the indoor units (22) for the other target space (SP2). In this case, the controller (30) controls the increment of the flow rate of air blown into the one of the target spaces (SP1) to be greater than or equal to the increment of the flow rate of air blown into the other target space (SP2).

The "increment of the flow rate of air blown into each target space (SP1, SP2)" as used herein means the amount of increase in the flow rate of air blown into the target space (SP1, SP2) by the outside air processing device (10). In particular, the "increment of the flow rate of air blown into each target space (SP1, SP2)" means how much the total airflow rate of the outside air processing device (10) is to be further increased if the outside air processing device (10) has supplied air to the target space (SP1, SP2) at a necessary airflow rate (e.g., the airflow rate determined based on the carbon dioxide concentration in the target space (SP1, SP2)).

As another specific example, if the total airflow rate of the outside air processing device (10) is to be increased during the common cooling operation, the controller (30) controls the increment of the flow rate of air blown into one of the target spaces (SP1, SP2) provided with the associated operating indoor units (22) to be greater than or equal to the increment of the flow rate of air blown into the other target space (SP1, SP2) provided with the associated nonoperating indoor units (22). In this case, the controller (30) may control the increment of the flow rate of air blown into the one of the target spaces (SP1, SP2) provided with the associated operating indoor units (22) to be greater than the increment of the flow rate of air blown into the other target space (SP1. SP2) provided with the associated nonoperating indoor units (22).

Suppose that, for example, in the common cooling operation, the indoor units (22) for one of the target spaces (SP1) are operating, and the indoor units (22) for the other target space (SP2) are nonoperating. In this case, the controller (30) controls the increment of the flow rate of air blown into the one of the target spaces (SP1) to be greater than or equal to the increment of the flow rate of air blown into the other target space (SP2).

Common Heating Operation

The common heating operation is an operation in which the outside air processing device (10) and the air-conditioning device (20) execute a heating operation. Specifically, in the common heating operation, the outside air processing device (10) executes an outside air heating operation (a heating operation in which outside air (OA) having a temperature that is higher than the indoor temperature is used), and the air-conditioning device (20) executes a heating operation. In the common heating operation, the target spaces (SP1, SP2) may, but do not have to, be humidified.

Basic Operation

In the common heating operation, the air supply fan (14) of the outside air processing device (10) is operated. This allows outside air (OA) to be taken through the intake port (15) into the air handling unit (11). The outside air (OA) taken into the air handling unit (11) is blown through the air supply ports (16) into the respective target spaces (SP1, SP2). The controller (30) adjusts the rotational speed of the air supply fan (14) to adjust the total airflow rate of the outside air processing device (10), and adjusts the opening degree of the damper for each air supply port (16) to adjust the flow rate of air blown into the associated target space (SP1, SP2).

In the common heating operation, the air-conditioning device (20) performs a normal cycle of operation. This allows inside air heated by the indoor units (22) for each target space (SP1, SP2) to be blown into the target space (SP1, SP2). The controller (30) controls the devices that constitute the air-conditioning device (20) to bring the condensation temperature in each indoor unit (22) closer to its target value (in other words, the required temperature of the heating medium in the indoor unit (22)).

Here, the load factor of each indoor unit (22) increases as the target value of the condensation temperature increases. The load factor of an operating one of the indoor units (22) is higher than that of a nonoperating one of the indoor units (22).

Adjustment of Flow Rates of Air Blown into Target Spaces

In the common heating operation, the controller (30) adjusts the flow rates of air blown into the target spaces (SP1, SP2) by the outside air processing device (10) to reduce the power consumption of the air-conditioning system (100).

As a specific example, if the total airflow rate of the outside air processing device (10) is to be increased during the common heating operation, the controller (30) controls the increment of the flow rate of air blown into one of the target spaces (SP1, SP2) provided with the associated indoor units (22) in each of which the target value of the condensation temperature is relatively high to be greater than or equal to the increment of the flow rate of air blown into the other target space (SP1, SP2) provided with the associated indoor units (22) in each of which the target value of the condensation temperature is relatively low. In this case, the controller (30) may control the increment of the flow rate of air blown into the one of the target spaces (SP1, SP2) provided with the associated indoor units (22) in each of which the target value of the condensation temperature is relatively high to be greater than the increment of the flow rate of air blown into the other target space (SP1, SP2) provided with the associated indoor units (22) in each of which the target value of the condensation temperature is relatively low.

Suppose that, for example, in the common heating operation, the target value of the condensation temperature in each of the indoor units (22) for one of the target spaces (SP1) is higher than the target value of the condensation temperature in each of the indoor units (22) for the other target space (SP2). In this case, the controller (30) controls the increment of the flow rate of air blown into the one of the target spaces (SP1) to be greater than or equal to the increment of the flow rate of air blown into the other target space (SP2).

As another specific example, if the total airflow rate of the outside air processing device (10) is to be increased during the common heating operation, the controller (30) controls the increment of the flow rate of air blown into one of the target spaces (SP1, SP2) provided with the associated operating indoor units (22) to be greater than or equal to the increment of the flow rate of air blown into the other target space (SP1, SP2) provided with the associated nonoperating indoor units (22). In this case, the controller (30) may control the increment of the flow rate of air blown into the one of the target spaces (SP1, SP2) provided with the associated operating indoor units (22) to be greater than the increment of the flow rate of air blown into the other target space (SP1. SP2) provided with the associated nonoperating indoor units (22).

Suppose that, for example, in the common heating operation, the indoor units (22) for one of the target spaces (SP1) are operating, and the indoor units (22) for the other target space (SP2) are nonoperating. In this case, the controller (30) controls the increment of the flow rate of air blown into the one of the target spaces (SP1) to be greater than or equal to the increment of the flow rate of air blown into the other target space (SP2).

Advantage (1) of First Embodiment

The air-conditioning system (100) of this embodiment includes the outside air processing device (10), the air-conditioning device (20), and the controller (30). The outside air processing device (10) is configured to adjust the temperature of outside air taken thereinto, and to supply the outside air to the target spaces (SP1, SP2). The air-conditioning device (20) includes the indoor units (22) at least one of which is provided for each target space (SP1, SP2), and is configured to adjust the temperatures of air in the target spaces (SP1, SP2). The controller (30) is configured to adjust the flow rates of air blown into the target spaces (SP1, SP2) by the outside air processing device (10) in accordance with the operating states of the associated indoor units (22) to reduce the power consumption of the air-conditioning system (100).

The controller (30) of this embodiment adjusts the flow rates of air blown into the target spaces (SP1, SP2) by the outside air processing device (10) in accordance with the operating states of the associated indoor units (22) to reduce the power consumption of the air-conditioning system (100). This operation of the controller (30) can reduce the power consumption of the air-conditioning system (100).

Advantage (2) of First Embodiment

In the air-conditioning system (100) of this embodiment, the load factor of each indoor unit (22) represents the ratio of the load of the indoor unit (22) to the rated capacity of the indoor unit (22), and the increment of the flow rate of air blown into each target space (SP1, SP2) represents the amount of increase in the flow rate of air blown into the target space (SP1, SP2) by the outside air processing device (10). In this case, if the total airflow rate of the outside air processing device (10) is to be increased, the controller (30) controls the increment of the flow rate of air blown into one of the target spaces (SP1, SP2) provided with the associated indoor units (22) having a relatively high load factor to be greater than or equal to the increment of the flow rate of air blown into the other target space (SP1, SP2) provided with the associated indoor units (22) having a relatively low load factor.

If the total airflow rate of the outside air processing device (10) is to be increased, the controller (30) of this embodiment preferentially increases the flow rate of air blown into the one of the target spaces (SP1, SP2) provided with the associated indoor units (22) having a relatively high load factor. This operation of the controller (30) can reduce variations in load factor among the indoor units (22), and can reduce the power consumption of the air-conditioning system (100).

Advantage (3) of First Embodiment

In the air-conditioning system (100) of this embodiment, if the air-conditioning device (20) cools the target spaces (SP1, SP2), the load factors of the indoor units (22) increase as the required temperature of the heating medium in the indoor units (22) decreases. In this case, if the air-conditioning device (20) heats the target spaces (SP1, SP2), the load factors of the indoor units (22) increase as the required temperature of the heating medium in the indoor units (22)

increases. If the air-conditioning device (20) cools the target spaces (SP1, SP2), and in this situation, the total airflow rate of the outside air processing device (10) is to be increased, the controller (30) controls the increment of the flow rate of air blown into one of the target spaces (SP1. SP2) provided with the associated indoor units (22) in each of which the required temperature of the heating medium is relatively low to be greater than or equal to the increment of the flow rate of air blown into the other target space (SP1, SP2) provided with the associated indoor units (22) in each of which the required temperature of the heating medium is relatively high. On the other hand, if the air-conditioning device (20) heats the target spaces (SP1, SP2), and in this situation, the total airflow rate of the outside air processing device (10) is to be increased, the controller (30) controls the increment of the flow rate of air blown into the other target space (SP1. SP2) provided with the associated indoor units (22) each of which the required temperature of the heating medium is relatively high to be greater than or equal to the increment of the flow rate of air blown into the one of the target spaces (SP1, SP2) provided with the associated indoor units (22) each of which the required temperature of the heating medium is relatively low.

If the total airflow rate of the outside air processing device (10) is to be increased during the cooling operation, the controller (30) of this embodiment preferentially increases the flow rate of air blown into the one of the target spaces (SP1, SP2) provided with the associated indoor units (22) in each of which the required temperature of the heating medium is relatively low. If the total airflow rate of the outside air processing device (10) is to be increased during the heating operation, this controller (30) preferentially increases the flow rate of air blown into the other target space (SP1, SP2) provided with the associated indoor units (22) in each of which the required temperature of the heating medium is relatively high. These operations of the controller (30) can reduce variations in load factor among the indoor units (22), and can reduce the power consumption of the air-conditioning system (100).

Advantage (4) of First Embodiment

In the air-conditioning system (100) of this embodiment, the load factor of an operating one of the indoor units (22) is higher than that of a nonoperating one of the indoor units (22). In this case, if the total airflow rate of the outside air processing device (10) is to be increased, the controller (30) controls the increment of the flow rate of air blown into one of the target spaces (SP1, SP2) provided with operating ones of the indoor units (22) to be greater than or equal to the increment of the flow rate of air blown into the other target space (SP1, SP2) provided with nonoperating ones of the indoor units (22).

If the total airflow rate of the outside air processing device (10) is to be increased, the controller (30) of this embodiment preferentially increases the flow rate of air blown into the one of the target spaces (SP1, SP2) provided with the operating ones of the indoor units (22). This can reduce variations in load factor among the indoor units (22), and can reduce the power consumption of the air-conditioning system (100).

Second Embodiment

A second embodiment will be described below. An air-conditioning system (100) of this embodiment is distinct from that of the first embodiment in the reference based on which the flow rate of air blown into each target space (SP1, SP 2) is adjusted. Thus, differences from the first embodiment will be mainly described below.

Adjustment of Airflow Rate in Common Cooling Operation

In the common cooling operation, the controller (30) adjusts the flow rates of air blown into the target spaces (SP1, SP2) by the outside air processing device (10) to reduce the power consumption of the air-conditioning system (100).

As a specific example, if the total airflow rate of the outside air processing device (10) is to be increased during the common cooling operation, the controller (30) controls the increment of the flow rate of air blown into one of the target spaces (SP1, SP2) provided with the associated indoor units (22) each having a relatively high set temperature or suction air temperature to be greater than or equal to the increment of the flow rate of air blown into the other target space (SP1, SP2) provided with the associated indoor units (22) each having a relatively low set temperature or suction air temperature. In this case, the controller (30) may control the increment of the flow rate of air blown into the one of the target spaces (SP1, SP2) provided with the associated indoor units (22) each having a relatively high set temperature or suction air temperature to be greater than the increment of the flow rate of air blown into the other target space (SP1, SP2) provided with the associated indoor units (22) each having a relatively low set temperature or suction air temperature.

Suppose that, for example, in the common cooling operation, the suction air temperatures of the indoor units (22) for one of the target spaces (SP1) are higher than those of the indoor units (22) for the other target space (SP2). In this case, the controller (30) controls the increment of the flow rate of air blown into the one of the target spaces (SP1) to be greater than or equal to the increment of the flow rate of air blown into the other target space (SP2).

Adjustment of Airflow Rate in Common Heating Operation

In the common heating operation, the controller (30) adjusts the flow rates of air blown into the target spaces (SP1, SP2) by the outside air processing device (10) to reduce the power consumption of the air-conditioning system (100).

As a specific example, if the total airflow rate of the outside air processing device (10) is to be increased during the common heating operation, the controller (30) controls the increment of the flow rate of air blown into one of the target spaces (SP1, SP2) provided with the associated indoor units (22) each having a relatively low set temperature or suction air temperature to be greater than or equal to the increment of the flow rate of air blown into the other target space (SP1, SP2) provided with the associated indoor units (22) each having a relatively high set temperature or suction air temperature. In this case, the controller (30) may control the increment of the flow rate of air blown into the one of the target spaces (SP1, SP2) provided with the associated indoor units (22) each having a relatively low set temperature or suction air temperature to be greater than the increment of the flow rate of air blown into the other target space (SP1, SP2) provided with the associated indoor units (22) each having a relatively high set temperature or suction air temperature.

Suppose that, for example, in the common heating operation, the suction air temperatures of the indoor units (22) for one of the target spaces (SP1) are lower than those of the indoor units (22) for the other target space (SP2). In this case, the controller (30) controls the increment of the flow rate of air blown into the one of the target spaces (SP1) to be greater than or equal to the increment of the flow rate of air blown into the other target space (SP2).

Advantages of Second Embodiment

The air-conditioning system (100) of this embodiment also achieves the same advantages and effects as those of the first embodiment.

In the air-conditioning system (100) of this embodiment, the increment of the flow rate of air blown into each target space (SP1, SP2) represents the amount of increase in the flow rate of air blown into the target space (SP1, SP2) by the outside air processing device (10). In this case, if the air-conditioning device (20) cools the target spaces (SP1, SP2), and in this situation, the total airflow rate of the outside air processing device (10) is to be increased, the controller (30) controls the increment of the flow rate of air blown into one of the target spaces (SP1. SP2) provided with the associated indoor units (22) each having a relatively high set temperature or suction air temperature to be greater than or equal to the increment of the flow rate of air blown into the other target space (SP1, SP2) provided with the associated indoor units (22) each having a relatively low set temperature or suction air temperature. On the other hand, if the air-conditioning device (20) heats the target spaces (SP1, SP2), and in this situation, the total airflow rate of the outside air processing device (10) is to be increased, the controller (30) sets the increment of the flow rate of air blown into the other target space (SP1, SP2) provided with the associated indoor units (22) each having a relatively low set temperature or suction air temperature to be greater than or equal to the increment of the flow rate of air blown into the one of the target spaces (SP1, SP2) provided with the associated indoor units (22) each having a relatively high set temperature or suction air temperature.

If the total airflow rate of the outside air processing device (10) is to be increased during the cooling operation, the controller (30) of this embodiment preferentially increases the flow rate of air blown into the one of the target spaces (SP1, SP2) provided with the associated indoor units (22) each having a relatively high set temperature or suction air temperature. If the total airflow rate of the outside air processing device (10) is to be increased during the heating operation, this controller (30) preferentially increases the flow rate of air blown into the other target space (SP1. SP2) provided with the associated indoor units (22) each having a relatively low set temperature or suction air temperature. These operations of the controller (30) allow the outside air processing device (10) to efficiently condition air, and can reduce the power consumption of the air-conditioning system (100).

Third Embodiment

A third embodiment will be described below. An air-conditioning system (100) of this embodiment is distinct from that of the first embodiment in the reference based on which the flow rate of air blown into each target space (SP1, SP2) is adjusted. Thus, differences from the first embodiment will be mainly described below.

Adjustment of Airflow Rate in Common Cooling or Heating Operation

In the common cooling or heating operation, the controller (30) adjusts the flow rates of air blown into the target spaces (SP1, SP2) by the outside air processing device (10) to reduce the power consumption of the air-conditioning system (100).

As a specific example, if the total airflow rate of the outside air processing device (10) is to be increased during the common cooling or heating operation, the controller (30) controls the increment of the flow rate of air blown into one of the target spaces (SP1, SP2) provided with the associated indoor units (22) each whose set temperature and suction air temperature are relatively significantly different from each other to be greater than or equal to the increment of the flow rate of air blown into the other target space (SP1. SP2) provided with the associated indoor units (22) each whose set temperature and suction air temperature are relatively insignificantly different from each other. In this case, the controller (30) may control the increment of the flow rate of air blown into the one of the target spaces (SP1, SP2) provided with the associated indoor units (22) each whose set temperature and suction air temperature are relatively significantly different from each other to be greater than the increment of the flow rate of air blown into the other target space (SP1, SP2) provided with the associated indoor units (22) each whose set temperature and suction air temperature are relatively insignificantly different from each other.

Suppose that, for example, in the common cooling operation, the difference between the set temperature and suction air temperature of each of the indoor units (22) for one of the target spaces (SP1) is greater than the difference between the set temperature and suction air temperature of each of the indoor units (22) for the other target space (SP2). In this case, the controller (30) controls the increment of the flow rate of air blown into the one of the target spaces (SP1) to be greater than or equal to the increment of the flow rate of air blown into the other target space (SP2).

Advantages of Third Embodiment

The air-conditioning system (100) of this embodiment also achieves the same advantages and effects as those of the first embodiment.

In the air-conditioning system (100) of this embodiment, the increment of the flow rate of air blown into each of the target spaces (SP1, SP2) represents the amount of increase in the flow rate of air blown into the target space (SP1, SP2) by the outside air processing device (10). If the total airflow rate of the outside air processing device (10) is to be increased, the controller (30) controls the increment of the flow rate of air blown into one of the target spaces (SP1, SP2) provided with the associated indoor units (22) each whose set temperature and suction air temperature are relatively significantly different from each other to be greater than or equal to the increment of the flow rate of air blown into the other target space (SP1, SP2) provided with the associated indoor units (22) each whose set temperature and suction air temperature are relatively insignificantly different from each other.

If the total airflow rate of the outside air processing device (10) is to be increased, the controller (30) of this embodiment preferentially increases the flow rate of air blown into the one of the target spaces (SP1, SP2) provided with the associated indoor units (22) each whose set temperature and suction air temperature are relatively significantly different from each other. This operation of the controller (30) allows the outside air processing device (10) to efficiently condition air, and can reduce the power consumption of the air-conditioning system (100).

Other Embodiments

The air-conditioning system (100) of each of the foregoing embodiments may be modified in the following manner.

Figure 3:
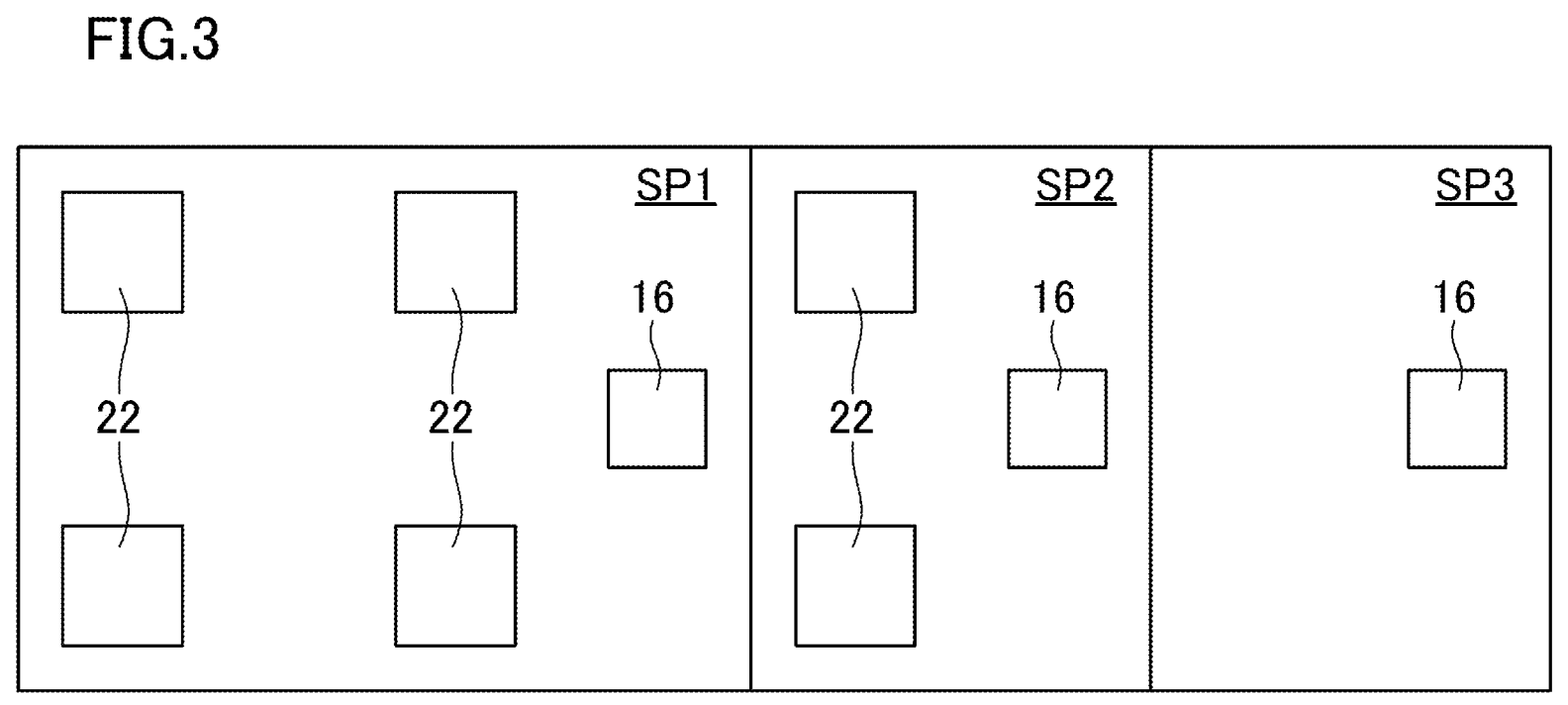

As illustrated in FIG. 3, in a building (BL) provided with the air-conditioning system (100) of each of the first to third embodiments, some of indoor spaces (SP1, SP2) may be target spaces each provided with indoor units (22) of an air-conditioning device (20).

In the example illustrated in FIG. 3, the building (BL) provided with the air-conditioning system (100) includes three indoor spaces (SP1, SP2, SP3). Each of the three indoor spaces (SP1, SP2, SP3) is provided with one air supply port (16). Each air supply port (16) is connected through an air supply duct (L2) to an air handling unit (11) of an outside air processing device (10). The air handling unit (11) supplies outside air (OA) to all of the indoor spaces (SP1, SP2, SP3).

In the example illustrated in FIG. 3, the first and second indoor spaces (SP1) and (SP2) are each provided with the indoor units (22), while the third indoor space (SP3) is provided with no indoor unit (22). In the example illustrated in FIG. 3, the first and second indoor spaces (SP1) and (SP2) are target spaces each provided with the indoor units (22).

In the air-conditioning system (100) of this variation, a controller (30) adjusts the increment of the flow rate of air blown into each of the first and second indoor spaces (SP1) and (SP2), which are the target spaces, as described above. The controller (30) of this variation may, but does not have to, adjust the increment of the flow rate of air blown into the third indoor space (SP3), which is not a target space.

While the embodiment and variations thereof have been described above, it will be understood that various changes in form and details may be made without departing from the spirit and scope of the claims. The foregoing embodiments and variations thereof may be combined and replaced with each other without deteriorating the intended functions of the present disclosure.

INDUSTRIAL APPLICABILITY

As can be seen from the foregoing description, the present disclosure is useful for an air-conditioner system.

EXPLANATION OF REFERENCES

10 Outside Air Processing Device
20 Air-Conditioning Device
22 Indoor Unit
30 Controller (Control Unit)
100 Air-Conditioning System
SP1, SP2 Target Space

The invention claimed is:
1. An air-conditioning system comprising:
an outside air processing device configured to adjust a temperature of outside air taken into the outside air processing device and to supply the outside air to a plurality of indoor spaces; and
an air-conditioning device including a plurality of indoor units at least one of which is installed in each of a plurality of target spaces that are some or all of the indoor spaces, the air-conditioning device being configured to adjust temperatures of air in the target spaces,
the air-conditioning system further comprising a control unit configured to adjust a flow rate of air blown into each target space by the outside air processing device in accordance with an operating state of the at least one of the indoor units to reduce power consumption of the air-conditioning system and control the flow rate of air blown into each target space by the outside air processing device based on a respective load factor for the plurality of indoor units, where at least one of the indoor units is operating, where each load factor of each of the indoor units represents a ratio of a load of the respective indoor unit to a rated capacity of the respective indoor unit, wherein
if a total airflow rate of the outside air processing device is to be increased, the control unit controls an increment of the flow rate of air blown into one of the target spaces provided with a first indoor unit, among the plurality of indoor units, having a first load factor to be greater than or equal to an increment of the flow rate of air blown into another one of the target spaces provided with a second indoor unit among the plurality of indoor units, having a second load factor lower than the first load factor,
where the increment of each flow rate of air blown into each target space represents an amount of increase in the flow rate of air blown into the respective target space by the outside air processing device.
2. The air-conditioning system of claim 1, wherein
if the air-conditioning device cools the target spaces, the load factor of each indoor unit increases as a required temperature of a heating medium in the indoor unit decreases, and if the air-conditioning device heats the target spaces, the load factor of the indoor unit increases as the required temperature of the heating medium in the indoor unit increases,
if the air-conditioning device cools the target spaces, and the total airflow rate of the outside air processing device is to be increased, the control unit controls the increment of the flow rate of air blown into one of the target spaces provided with a third indoor unit, among the plurality of indoor units, where the a first temperature of the heating medium is to be greater than or equal to the increment of the flow rate of air blown into another one of the target spaces provided with a fourth indoor unit, among the plurality of indoor units, with a second temperature of the heating medium higher than the first temperature, and
if the air-conditioning device heats the target spaces, and the total airflow rate of the outside air processing device is to be increased, the control unit controls the increment of the flow rate of air blown into one of the target spaces provided with the third indoor unit where a third temperature of the heating medium is to be greater than or equal to the increment of the flow rate of air blown into another one of the target spaces provided with a fourth indoor unit, among the plurality of indoor units, with a fourth temperature of the heating medium lower than the third temperature.
3. The air-conditioning system of claim 2, wherein
if the air-conditioning device cools the target spaces, and a total airflow rate of the outside air processing device is to be increased, the control unit controls an increment of the flow rate of air blown into one of the target spaces provided with a first indoor unit, among the plurality of indoor units, having a first set temperature or suction air temperature to be greater than or equal to an increment of the flow rate of air blown into another one of the target spaces provided with a second indoor unit, among the plurality of indoor units, having a second set temperature or suction air temperature, the second set temperature or suction air temperature being lower than the first set temperature or suction air temperature, and if the air-conditioning device heats the target spaces, and the total airflow rate of the outside air processing device is to be increased, the control unit controls the increment of the flow rate of air blown into one of the target spaces provided with first indoor unit having a third set temperature or suction air temperature to be greater than or equal to the increment of the flow rate of air blown into another one of the target spaces provided with the second indoor unit having a fourth set temperature or suction air temperature higher than the third set temperature or suction air temperature, where each increment of the flow rate of air blown into each target space represents an amount of increase in the flow rate of air blown into the respective target space by the outside air processing device.

4. The air-conditioning system of claim 2, wherein if a total airflow rate of the outside air processing device is to be increased, the control unit controls an increment of the flow rate of air blown into one of the target spaces provided with the at least one associated indoor unit, whose set temperature and suction air temperature have a first difference from each other, to be greater than or equal to an increment of the flow rate of air blown into another one of the target spaces provided with the at least one associated indoor unit, whose set temperature and suction air temperature have a second difference from each other smaller than the first difference, where each increment of the flow rate of air blown into each target space represents an amount of increase in the flow rate of air blown into the respective target space by the outside air processing device.

5. The air-conditioning system of claim 1, wherein the load factor of an operating one of the indoor units is higher than that of a nonoperating one of the indoor units, and if the total airflow rate of the outside air processing device is to be increased, the control unit controls the increment of the flow rate of air blown into one of the target spaces provided with the operating one of the indoor units to be greater than or equal to the increment of the flow rate of air blown into another one of the target spaces provided with the nonoperating one of the indoor units.

6. The air-conditioning system of claim 5, wherein if the air-conditioning device cools the target spaces, and a total airflow rate of the outside air processing device is to be increased, the control unit controls an increment of the flow rate of air blown into one of the target spaces provided with a first indoor unit, among the plurality of indoor units, having a first set temperature or suction air temperature to be greater than or equal to an increment of the flow rate of air blown into another one of the target spaces provided with a second indoor unit, among the plurality of indoor units, having a second set temperature or suction air temperature, the second set temperature or suction air temperature being lower than the first set temperature or suction air temperature, and if the air-conditioning device heats the target spaces, and the total airflow rate of the outside air processing device is to be increased, the control unit controls the increment of the flow rate of air blown into one of the target spaces provided with first indoor unit having a third set temperature or suction air temperature to be greater than or equal to the increment of the flow rate of air blown into another one of the target spaces provided with the second indoor unit having a fourth set temperature or suction air temperature higher than the third set temperature or suction air temperature, where each increment of the flow rate of air blown into each target space represents an amount of increase in the flow rate of air blown into the respective target space by the outside air processing device.

7. The air-conditioning system of claim 5, wherein if a total airflow rate of the outside air processing device is to be increased, the control unit controls an increment of the flow rate of air blown into one of the target spaces provided with the at least one associated indoor unit, whose set temperature and suction air temperature have a first difference from each other, to be greater than or equal to an increment of the flow rate of air blown into another one of the target spaces provided with the at least one associated indoor unit, whose set temperature and suction air temperature have a second difference from each other smaller than the first difference, where each increment of the flow rate of air blown into each target space represents an amount of increase in the flow rate of air blown into the respective target space by the outside air processing device.

8. The air-conditioning system of claim 1, wherein if the air-conditioning device cools the target spaces, and a total airflow rate of the outside air processing device is to be increased, the control unit controls an increment of the flow rate of air blown into one of the target spaces provided with a first indoor unit, among the plurality of indoor units, having a first set temperature or suction air temperature to be greater than or equal to an increment of the flow rate of air blown into another one of the target spaces provided with a second indoor unit, among the plurality of indoor units, having a second set temperature or suction air temperature, the second set temperature or suction air temperature being lower than the first set temperature or suction air temperature, and if the air-conditioning device heats the target spaces, and the total airflow rate of the outside air processing device is to be increased, the control unit controls the increment of the flow rate of air blown into one of the target spaces provided with the first indoor unit having a third set temperature or suction air temperature to be greater than or equal to the increment of the flow rate of air blown into another one of the target spaces provided with the second indoor unit having a fourth set temperature or suction air temperature higher than the third set temperature or suction air temperature, where each increment of the flow rate of air blown into each target space represents an amount of increase in the flow rate of air blown into the respective target space by the outside air processing device.

9. The air-conditioning system of claim 1, wherein if a total airflow rate of the outside air processing device is to be increased, the control unit controls an increment of the flow rate of air blown into one of the target spaces provided with the at least one associated indoor unit, whose set temperature and suction air temperature have a first difference from each other, to be greater than or equal to an increment of the flow rate of air blown into another one of the target spaces provided with the at least one associated indoor unit, whose set temperature and suction air temperature have a second difference from each other smaller than the first difference, where each increment of the flow rate of air blown into each target space represents an amount of increase in the flow rate of air blown into the respective target space by the outside air processing device.

10. An air-conditioning system comprising:

an outside air processing device configured to adjust a temperature of outside air taken into the outside air processing device and to supply the outside air to a plurality of indoor spaces; and an air-conditioning device including a plurality of indoor units at least one of which is installed in each of a plurality of target spaces that are some or all of the indoor spaces, the air-conditioning device being configured to adjust temperatures of air in the target spaces, the air-conditioning system further comprising a control unit configured to adjust a flow rate of air blown into each target space by the outside air processing device in accordance with an operating state of the at least one of the indoor units to reduce power consumption of the air-conditioning system, wherein if the air-conditioning device cools the target spaces, and a total airflow rate of the outside air processing device is to be increased, the control unit controls an increment of the flow rate of air blown into one of the target spaces provided with a first indoor unit, among the plurality of indoor units, having a first set temperature or suction air temperature to be greater than or equal to an increment of the flow rate of air blown into another one of the target spaces provided with a second indoor unit, among the plurality of indoor units, having a second set temperature or suction air temperature, the second set temperature or suction air temperature being lower than the first set temperature or suction air temperature, and if the air-conditioning device heats the target spaces, and the total airflow rate of the outside air processing device is to be increased, the control unit controls the increment of the flow rate of air blown into one of the target spaces (SP1, SP2) provided with the first indoor unit having a third set temperature or suction air temperature to be greater than or equal to the increment of the flow rate of air blown into another one of the target spaces provided with the second indoor unit having a fourth set temperature or suction air temperature higher than the third set temperature or suction air temperature, where each increment of the flow rate of air blown into each target space represents an amount of increase in the flow rate of air blown into the respective target space by the outside air processing device.

11. An air-conditioning system comprising:

an outside air processing device configured to adjust a temperature of outside air taken into the outside air processing device and to supply the outside air to a plurality of indoor spaces; and an air-conditioning device including a plurality of indoor units at least one of which is installed in each of a plurality of target spaces that are some or all of the indoor spaces, the air-conditioning device being configured to adjust temperatures of air in the target spaces, the air-conditioning system further comprising a control unit configured to adjust a flow rate of air blown into each target space by the outside air processing device in accordance with an operating state of the at least one of the indoor units to reduce power consumption of the air-conditioning system, wherein if a total airflow rate of the outside air processing device is to be increased, the control unit controls an increment of the flow rate of air blown into one of the target spaces provided with the at least one associated indoor unit, whose set temperature and suction air temperature have a first difference from each other, to be greater than or equal to an increment of the flow rate of air blown into another one of the target spaces provided with the at least one associated indoor unit, whose set temperature and suction air temperature have a second difference from each other smaller than the first difference, where each increment of the flow rate of air blown into each target space represents an amount of increase in the flow rate of air blown into the respective target space by the outside air processing device.

* * * * *